United States Patent
Konegen et al.

(10) Patent No.: US 7,384,673 B2
(45) Date of Patent: Jun. 10, 2008

(54) CONVOLUTED BOOT AND CONSTANT VELOCITY JOINT LUBRICANT

(75) Inventors: Herbert Konegen, Rösrath (DE); Hans Schreiber, Völklingen (DE); Lothar Gasper, Lohmar (DE)

(73) Assignee: GKN Automotive GmbH, Lohmar (DE)

( * ) Notice: Subject to any disclaimer, the term of this patent is extended or adjusted under 35 U.S.C. 154(b) by 438 days.

(21) Appl. No.: 10/328,272

(22) Filed: Dec. 23, 2002

(65) Prior Publication Data

US 2003/0143353 A1 Jul. 31, 2003

(30) Foreign Application Priority Data

Dec. 24, 2001 (DE) ................. 101 64 047

(51) Int. Cl.
*B29D 22/00* (2006.01)
*B29D 23/00* (2006.01)
*B32B 1/08* (2006.01)

(52) U.S. Cl. ............... 428/35.7; 464/8; 464/15; 464/145; 464/171; 277/635

(58) Field of Classification Search ............... 428/34.1, 428/35.7; 464/8, 15, 145, 171; 277/635
See application file for complete search history.

(56) References Cited

U.S. PATENT DOCUMENTS

| | | | | |
|---|---|---|---|---|
| 4,198,267 A | * | 4/1980 | Flaherty | ............. 162/158 |
| 4,798,900 A | * | 1/1989 | Stahly | ............. 548/461 |
| 5,733,986 A | * | 3/1998 | Senda et al. | ............. 525/440 |
| 6,319,880 B1 | | 11/2001 | Okaniwa et al. | |
| 6,569,021 B1 | * | 5/2003 | Schmidt et al. | ............. 428/36.9 |
| 6,743,482 B2 | * | 6/2004 | Schmidt et al. | ............. 427/384 |
| 2003/0143355 A1 | * | 7/2003 | Schmidt et al. | ............. 428/36.9 |

FOREIGN PATENT DOCUMENTS

| | | |
|---|---|---|
| EP | 0 719 851 B1 | 2/2000 |
| JP | 06240274 A * | 8/1994 |
| WO | WO 99/25997 * | 5/1999 |

* cited by examiner

*Primary Examiner*—Michael C. Miggins

(57) ABSTRACT

A convoluted boot for constant velocity joints and a constant velocity joint lubricant for use in such a convoluted boot. An additive which is added to the constant velocity joint lubricant and/or to the convoluted boot material is provided. The additive comprises amide waxes and also may include hydrocarbon oils. Use is made, in particular, of monoamides and/or diamides of carboxylic acids with 8 to 50 carbon atoms to form, by diffusion, a lubricating film on the surface of a convoluted boot. Furthermore, oleic acid amide and/or ethylenediamine distearate result in a particularly early formation of a lubricating film on the outer boot surface and thus to a long-term prevention of noise.

45 Claims, 5 Drawing Sheets

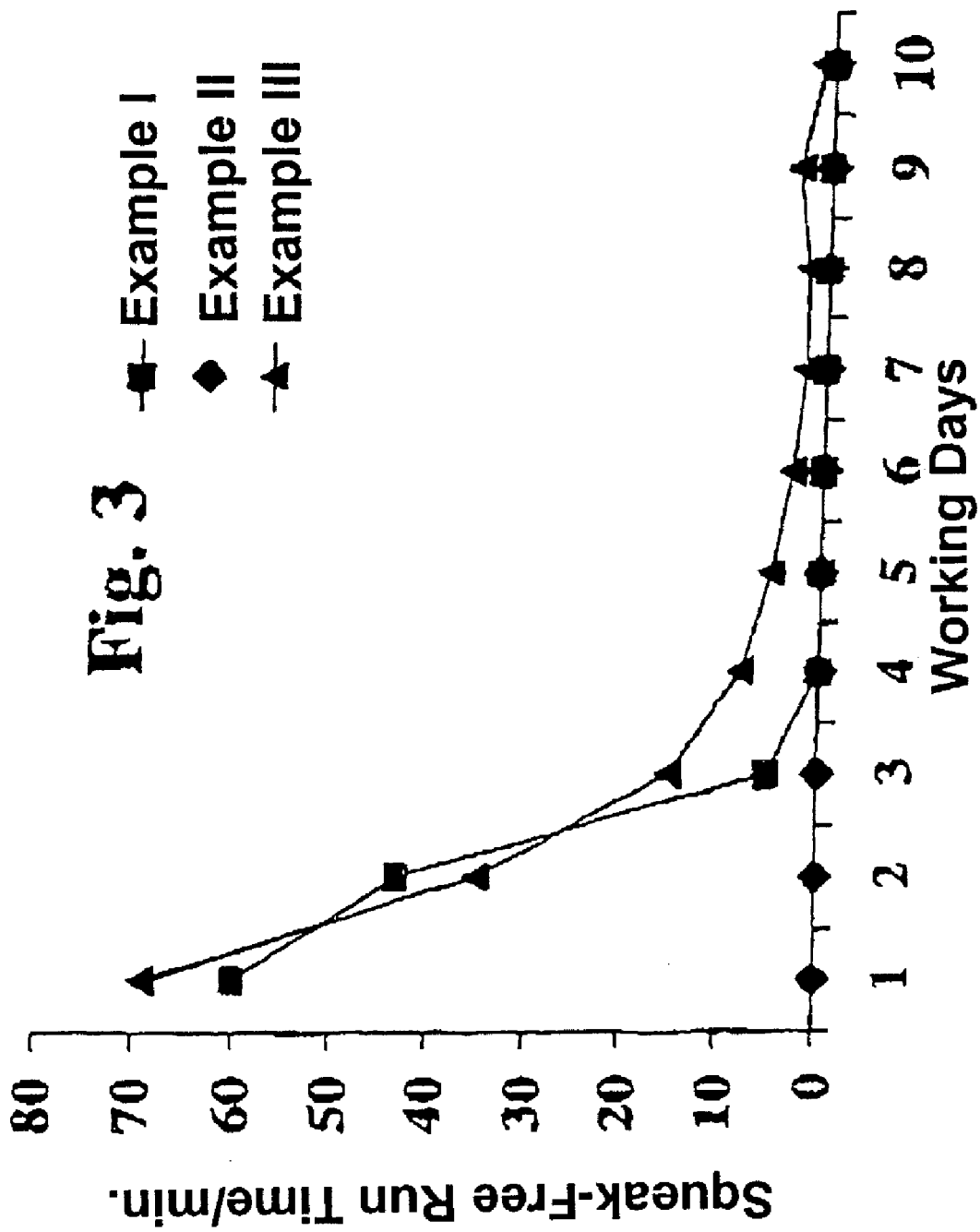

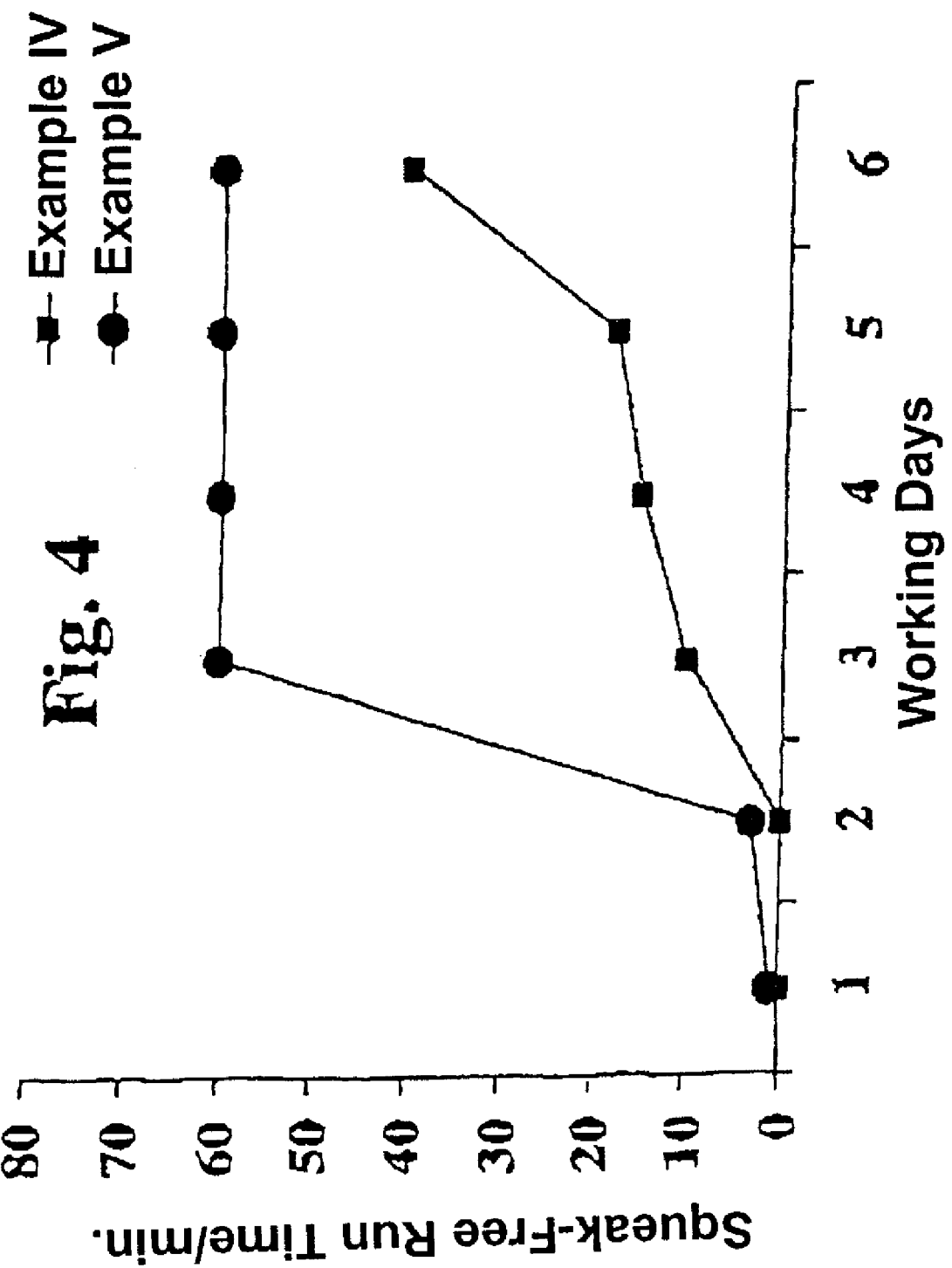

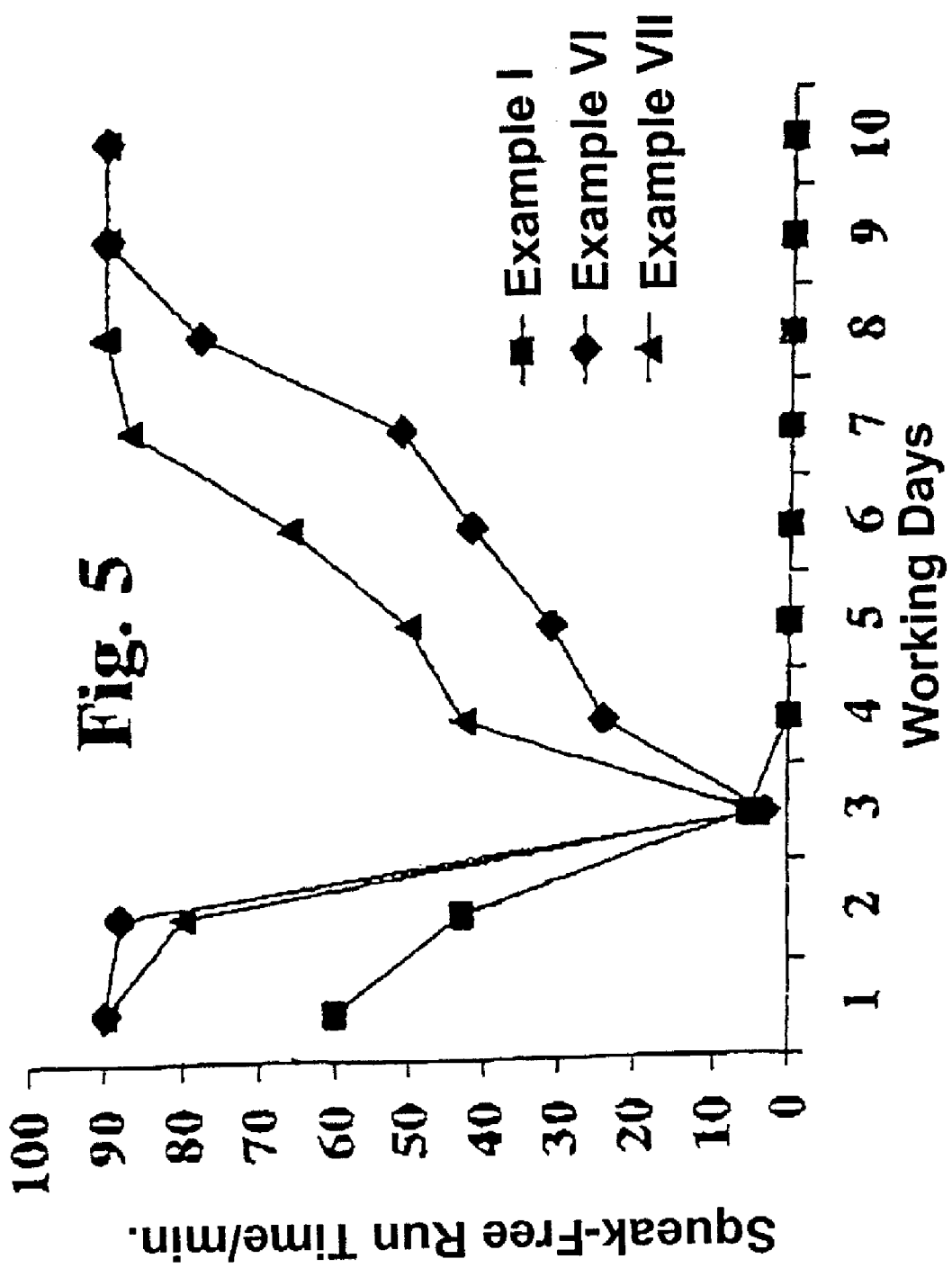

CONVOLUTED BOOT AND CONSTANT VELOCITY JOINT LUBRICANT

TECHNICAL FIELD

The invention relates to a convoluted boot for constant velocity joints and to a constant velocity joint lubricant for use in connection with such a convoluted boot.

BACKGROUND OF THE INVENTION

Convoluted boots are used to seal lubricant within the open ends of constant velocity joints and to protect such joints from environmental conditions such as dirt and water. Typically, a convoluted boot, at its large opening, is connected by means of a first collar to the outer part of a constant velocity joint and, at the small opening at the other end, it is secured by means of a second collar on a driveshaft. Annular folds between the collars of the boot make it possible to follow every change in the angle of the driveshaft relative to the outer part of the constant velocity joint. The convoluted boot prevents the lubricant from escaping from the constant velocity joint and dirt from entering the joint.

Convoluted boots are presently produced from thermoplastic elastomers, and preferably elastomers based on polyester. At high articulation angles, the folds of the boot rub against one another which, when the joint rotates, can lead to the development of a great deal of noise and also to mechanical damage to the boot, due to the abrasion of the polymer material. Particularly, when the outside of the boot folds are wet, such boots commonly generate a particularly unpleasant type of noise in the form of a squeaking sound.

To prevent or reduce the development of noise and abrasion, several proposals have been made. For instance, it has been attempted to provide the outer surface of the boot with a special coating consisting of waxes and/or paraffinic oils and/or ester oils, thus generating a lubricating and noise-reducing effect when the convoluted boot is articulated and when, as a result thereof, there occurs a close contact between the folds. However, it has been found that this type of coating is not sufficient for providing long-term protection. Especially under wet and very dusty conditions, the coating is used up relatively quickly. In addition, there is the disadvantageous need for highly technological methods required for treating the outer surface of the boot.

Convoluted boots are produced by processing a granular, thermoplastic elastomer material. It has been proposed to work amide waxes and/or paraffinic oils into the boot wall via said granulate. In this regard, use is made of the insignificant ability of materials based on thermoplastic, elastomer polyester to receive this type of component, which leads to the components being separated on the boot surface where they form a coating similar to that described in the previous paragraph. This means that in this case, too, adequate, permanent adherence of the lubricating components is not ensured.

There exists an additional disadvantage in that the admixtures are also separated towards the inner boot surface, which, in the region of the clamping-in zones of the collar, especially at low temperatures, leads to friction locking problems between the boot, outer joint part, driveshaft and connecting elements.

Furthermore, there exists the risk of damaging emissions as a result of vaporisation and thermal decomposition of the added components in the course of the processing of the granulate. In particular, such undesirable emissions occur in cases when phosphoric acid esters are worked into the granulate.

Furthermore, it was proposed to work carbonic acid ester into a polyester material. However, it has been found that with this kind of additive, the polyester material only begins to swell, but it is not possible to achieve tribological conditions at the outer boot surface.

DE 100 36 447 A1 describes a flexible artificial resin sleeve and a method of producing same. The artificial resin sleeve which, in particular, is used in constant velocity joints at the driveshafts of motor vehicles, substantially consists of a thermoplastic polyester elastomer resin. To prevent the above-described development of noise, it was proposed to add mineral oil or vegetable oil to the thermoplastic elastomer resin to prevent the development of noise at the start of operation and at a later stage, even under conditions where the joint with the sleeve is rotated at large angles. It was also the object of the above publication that the noise-reducing effect of the sleeve described therein should continue over a long period of time. However, it has been found that the addition of large amounts of mineral oils or vegetable oils led to a decrease in the friction coefficient in the friction locking connections, which is due to the fact that a lubricating film is formed not only in the regions of the folds, but also in the region of the connections with the driveshaft and the outer joint part of the constant velocity joint.

SUMMARY OF THE INVENTION

It is therefore an object of the prevent invention to provide a convoluted boot and a constant velocity joint lubricant which permit the formation of a stable film of lubricant on the outer face of the boot, which film suppresses the development of noise (squeak) and, in addition, prevents abrasion on the outer boot surface.

The present invention provides a convoluted boot for a constant velocity joint. The convoluted boot comprises a thermoplastic elastomer material based on polyurethane (TPU), polyamide (TPA), polyolefins (TPO), polyester (TPEE), or a thermoplastic elastomer vulcanizate (TPV) or a thermoplastic poly-ether-ester-elastomer (TEEE), wherein the convoluted boot material contains an additive comprising amide waxes in a concentration below the saturation limit and diffusion-promoting admixtures.

Furthermore, the present invention provides a constant velocity joint lubricant for a constant velocity joint with a convoluted boot, comprising an additive containing amide waxes and diffusion-promoting admixtures.

In consequence, the invention relates to a constant velocity joint lubricant and a convoluted boot which contain an additive in accordance with the invention to prevent abrasion of the outer boot surface and suppress the development of noise during joint operation.

Further advantageous embodiments are described in the sub-claims. In particular, they apply to a convoluted boot wherein the convoluted boot material contains hydrocarbon oil in a concentration below the saturation limit; the convoluted boot material contains 0.1 to 1.0% by weight of amide wax; the convoluted boot material contains 0.1 to 5% by weight of hydrocarbon oil or 0.1 to 5% by weight of amide wax and hydrocarbon oil in total; in the convoluted boot material there are contained hydrocarbon oils with a molecular weight ranging between 150 and 2,000; wherein, in particular, hydrocarbon oils are provided in the form of paraffinic mineral oils, naphtenic mineral oils, poly-alpha-olefins, polybutene, polyisobutelene, squalene or alkylbenzenes with straight or branched paraffinic side chains; amide waxes are provided in the form of monoamides and/or diamides of carboxylic acids with 8 to 50 carbon atoms; amide waxes are provided in the form of oleic acid amide and/or ethylenediamine distearate; or the diffusion-promoting admixture is provided in the form of phosphoric acid ester, fatty acid ester, both in the form of diester or polyolester, or thioether; wherein, in particular, in the convoluted boot material there are contained 0.1 to 5.0% by weight of diffusion-promoting admixtures, and preferably 0.1 to 1.0% by weight of diffusion-promoting admixtures.

Furthermore, the present invention provides a constant velocity joint lubricant wherein the additive contains hydrocarbon oils; the lubricant for the constant velocity joint contains 0.1 to 10.0%, in particular 0.1 to 1.0% by weight of amide wax; the lubricant for the constant velocity joint contains 0.1 to 5% by weight of hydrocarbon oil or 0.1 to 5% by weight of amide wax and hydrocarbon oil in total; in the additive, there are contained hydrocarbon oils with a molecular weight ranging between 150 and 2000; wherein, in particular, the hydrocarbon oils are provided in the form of paraffinic mineral oils, naphtenic mineral oils, poly-alpha-olefins, polybutene, polyisobutelene, squalene or alkylbenzenes with straight or branched paraffinic side chain; the additive, in the form of amide waxes, contains monoamides and/or diamides of carboxylic acids with 5 to 50 carbon atoms; the additive, in the form of amide waxes, contains oleic add amide and/or ethylenediamine distearate; the additive, in the form of a diffusion-promoting admixture, contains phosphoric add ester, fatty add ester, both in the form of diester or polyolester, or thioether; the additive contains 0.1 to 5.0% by weight of diffusion-promoting admixtures.

Thus, the present invention provides an additive which is added to the constant velocity joint lubricant and/or to the convoluted boot material. The inventive additive comprises amide waxes and diffusion-promoting admixtures. In one embodiment, use is made of amide waxes such as monoamides and/or diamides of carboxylic acids with 8 to 50, and preferably 8 to 30 carbon atoms which, surprisingly, demonstrate an optimum diffusion behavior towards the surface of a convoluted boot for forming a lubricating film thereon.

Furthermore, by the present invention, it has been found that oleic acid amide and/or ethylenediamine are responsible for the formation of a lubricating film on the surface of a convoluted boot at a particularly early stage. Thus, such treatments have a long-lasting effect with regard to the prevention of noise.

According to a further embodiment of the invention, the additive contains carboxylic acid oils in order to form an early, long-lasting lubricating film on the outer surface of the boot.

In an advantageous way, use is made of paraffinic and naphtenic mineral oils, poly-alpha-olefins, polybutene, polyisobutelene, squalene, alkylbenzenes or aromatic systems with paraffinic side chains and saturated cyclic hydrocarbons, and in particular, use is made of paraffin oils with a molecular weight ranging between 150 and 2,000.

A further advantageous embodiment of the invention relates to the content of diffusion-promoting admixtures in the additive, which admixtures have an advantageous effect on the diffusion of the additive components on the outer surface of the boot. In particular, examples include phosphoric acid ester and fatty acid ester, both in the form of diester or polyolester, and thioether.

The term "diffusion-promoting admixture" does not mean that the groups of chemical compounds were known to be diffusion-promoting. On the contrary, it has come as a surprise that the presence of the compounds in the additive in accordance with the invention contributes to a rapid and long-lasting transport of the amide waxes and, optionally, of the hydrocarbon oils to the outer boot surface, thus permitting the formation of a constant lubricating film.

When adding the inventive additive to a polymer granulate used for the production of convoluted boots, it is advantageous to specify the diffusion-promoting admixtures in the additive as amounting to 0.1 to 1% by weight relative to the convoluted boot material.

For producing the convoluted boots, use, in particular, is made of granulates comprising thermoplastic elastomer materials (TPE) based on polyurethane (TPU), polyamide (TPA), polyolefins (TPO), polyester (TPEE); thermoplastic elastomer vulcanizates (TPV); and thermoplastic poly-ether-ester-elastomers (TEEE).

The percentage of additive in the convoluted boot should not exceed the saturation value in the respective polymer material as, otherwise, there can immediately occur disadvantageous effects regarding the slip resistance of the connections in the collar region of the convoluted boot. The advantage of providing the additive in the convoluted boot material is that, especially at the start of operational use, there very quickly forms a lubricating film on the outer surface of the boot, which lubricating film, in time, can be complemented or replaced by the diffusion of the additive from the constant velocity joint lubricant inside the convoluted boot through the boot wall on to the outer boot surface. Because of a greater reservoir of additive in the lubricant, a long-term effect can then advantageously be achieved.

It is advantageous to add 0.1 to 10% by weight of additive to the lubricant and 0.1 to 1% by weight of additive to the granulate, with the percentages of additive in the granulate which exceed 0.5% of additive having preferably to be added in a finely adjusted combination of amide waxes and paraffin oil in connection with diffusion-promoting admixtures.

The addition of an inventive additive to the constant velocity joint lubricant, depending on the quantity, possibly changes the physical properties of the lubricant. It is therefore necessary—as a function of the quantity of additive added—to adjust the composition of the lubricant accordingly.

A method of producing the constant velocity joint lubricant allows the additive to be worked in at temperatures below 100° C. and, in particular, also at room temperature. In this way, it is possible to avoid vaporisation losses in respect of the diffusion-promoting admixtures. The uniform distribution of the additive in the lubricant is not obstructed.

A particularly rapid and undisturbed diffusion of the additive on the outer boot surface is advantageously achieved by producing a porous roughness on the outer surface of the convoluted boot in the fold region.

By being mixed with the constant velocity joint lubricant in a cold or warm condition, the inventive additive is inclined to build up an effective system which, under room temperature conditions, permits a continuous movement of additive components from the convoluted boot wall or lubricant through the boot wall to the outer boot surface. Surprisingly, it has also been found in this connection that minute additive components which have been worked via the granulate into the boot wall, i.e. which are well below the degree of saturation, are conveyed to the surface. This leads to very advantageous initial lubricating conditions. Under operational conditions, e.g. when the temperature has reached 50° C., the additive components, such as low melting point amide wax or fatty acid ester, are activated to migrate to the boot surface. Such a migration effect ensures stable tribological conditions in the boot wall and on the boot surface in the flank region of the annular folds. This results in a number of advantages relative to working in lubricants into the granulate at high temperatures (<100° C.), as described in DE 100 36 447 A1. The disadvantages which can occur when working in lubricant under high temperatures do not apply to the inventive components worked into the lubricant.

If the inventive additives are worked into the lubricant only, the clamping-in zones of the boot remain largely free from lubricant, so that there hardly occur any changes in the friction values, with the collar continuing to adhere firmly to the components. Nor is it possible to prove any disadvantageous deterioration in the joint lubrication because the additives worked into the lubricant are adapted to the respective requirements; they are accommodated by the boot material in a relatively short time and diffuse towards the outer surface of the boot.

The diffusion-promoting admixtures contained in the additive, such as phosphoric acid ester, promote the migration of the amid waxes and paraffin oils deposited in front of the boot wall towards the outer boot surface, which, in an advantageous way, leads to good initial lubricating conditions.

Because of the relatively large additive reservoir in the lubricant, there takes place a constant re-supply of additive from the lubricant through the boot wall to the outer boot surface. The inventive additive can be used in all standard constant velocity joint lubricants. On occasion, slight modifications in the lubricants may be necessary, if the percentages of additive are in the upper range. This applies to the adaptation of physical properties such as penetration, load bearing capacity and low temperature behavior.

In an advantageous way, when using the inventive additive, it is now possible to use TPE fixed joint boot designs which, so far, could not be used.

A further advantage which was discovered surprisingly shows that the use of the inventive additive delays or prevents the undesirable exit of mobile components (e.g. basic oil) from the lubricant.

The described diffusion lubrication can be supported by providing a porous outer boot surface in the fold region with a basic depth of roughness of 5 to 30 µm. Adverse effects of this on the physical boot properties have not been observed.

Surprisingly, it has also been found that by adding the inventive additive, the mechanical abrasion on the surface of the convoluted boot is clearly reduced both in the polymer granulate for producing the boots and in the lubricant, which, in an advantageous way, results in a longer service life of the convoluted boots.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention.

In the drawings:

FIG. 3 is a graphic illustration of the squeak behavior in examples I to III.

FIG. 4 is a graphic illustration of the squeak behavior in examples IV and V.

FIG. 5 is a graphic illustration of the squeak behavior in examples I, VI and VII.

DETAILED DESCRIPTION OF THE INVENTION

Figure 1:
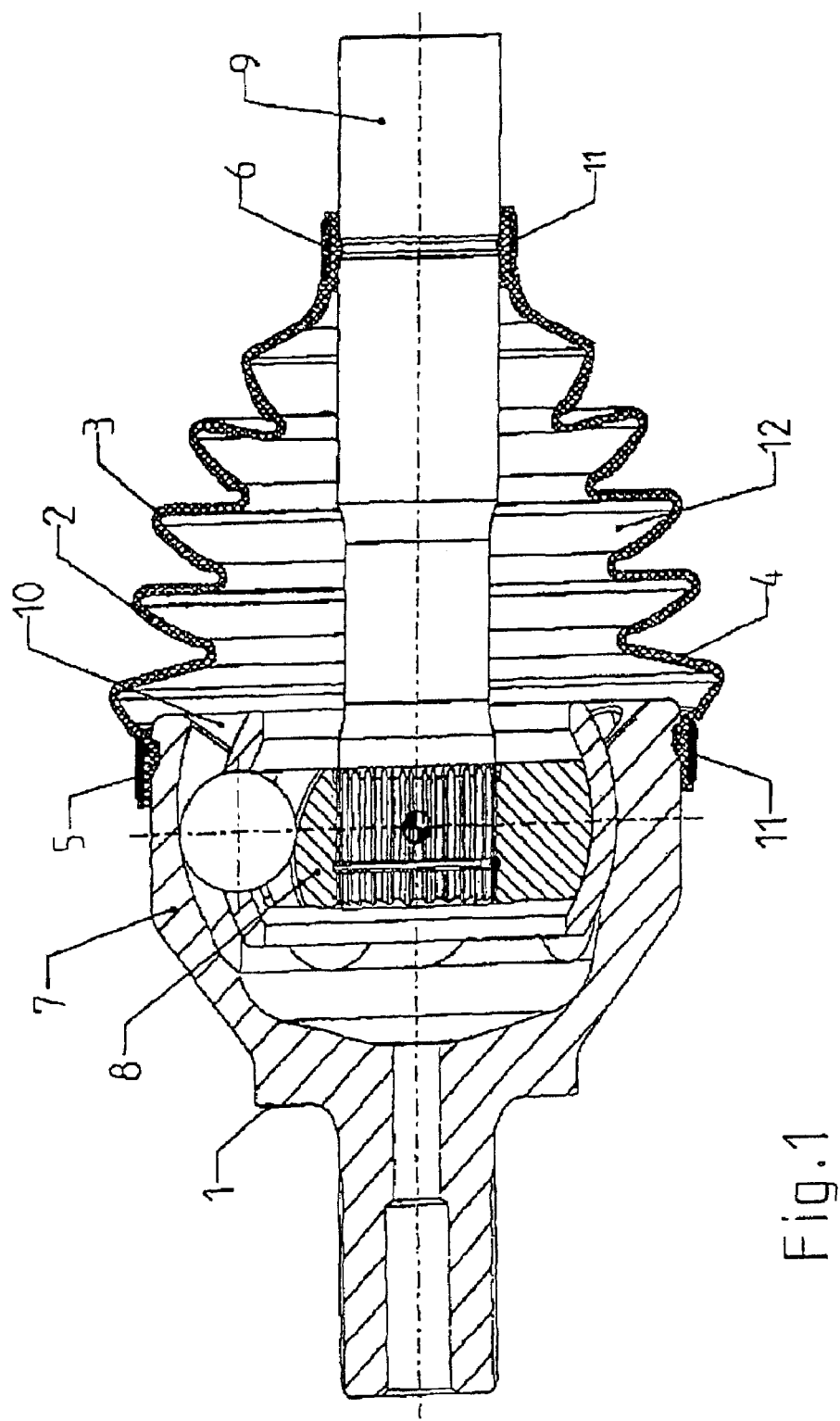
FIG. 1 is a partial section through a constant velocity joint with a convoluted boot in which the present invention may be used to advantage.

FIG. 1, by way of example, shows an embodiment of a constant velocity joint 1 with an associated convoluted boot 2. By means of clamping strips 11, a large sleeve 5 and a small sleeve 6 of the convoluted boot 2 are secured to a shaft 9 connected to an inner joint part 8, and to an outer joint part 7.

A joint chamber 10 is sealed towards the outside by means of the convoluted boot 2. In the joint chamber 10 and in the interior 12 of the convoluted boot 2, there is contained lubricant. The convoluted boot 2 is normally produced from a thermoplastic elastomer polymer (TPE) based on polyurethane, polyamides, polyolefins, polyethers or polyesters. When using the inventive additives, the polymer materials do not undergo any disadvantageous changes, for example in respect of their mechanical properties.

Figure 2:
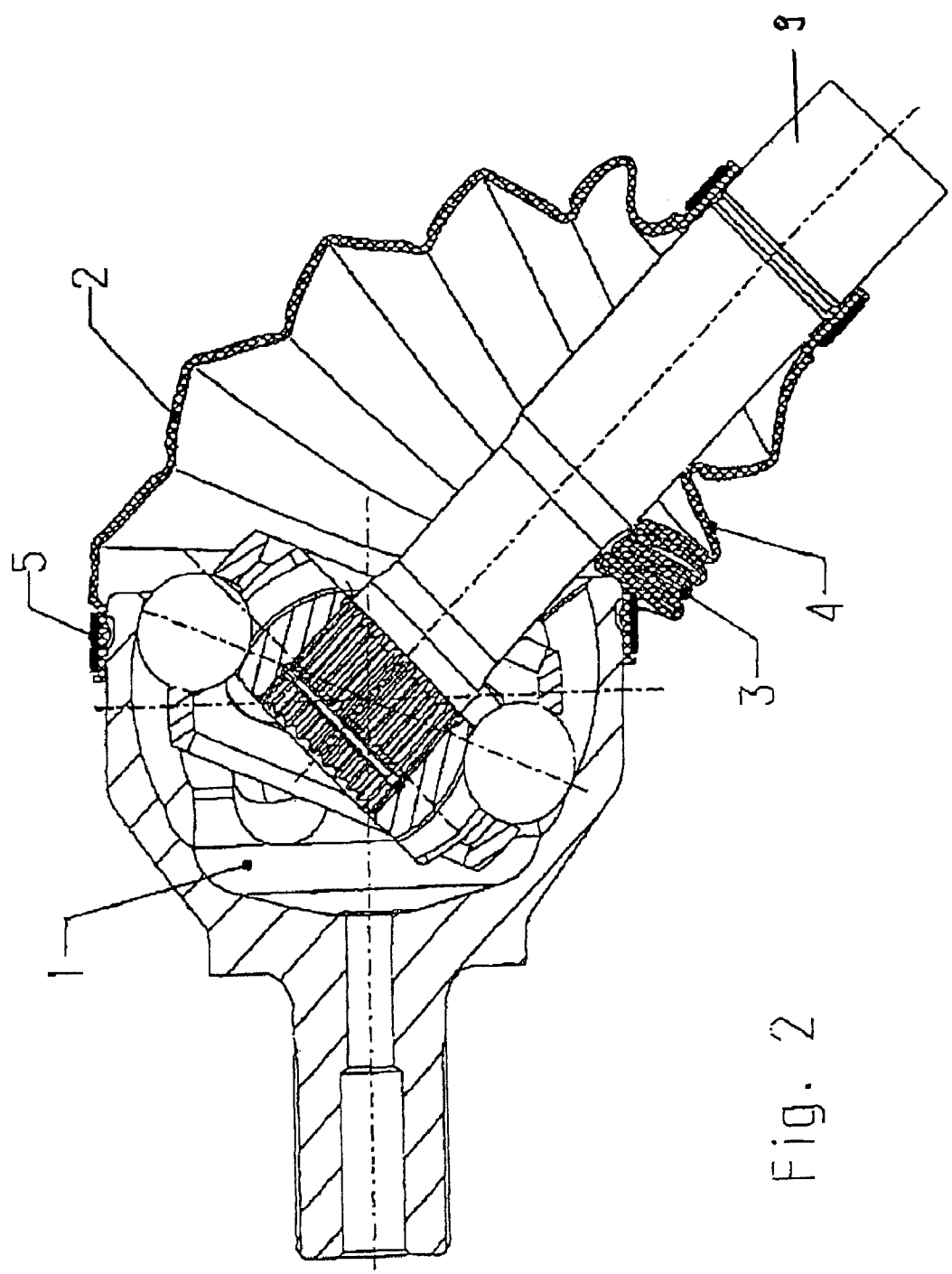
FIG. 2 is a diagrammatic illustration of an articulated convoluted boot.

When operating the constant velocity joint 1 in a motor vehicle, with the joint continuously rotating and being articulated at a large angle as shown in FIG. 2, folds 3 of the convoluted boot 2 contact one another by means of their outer surfaces 4 and rub against one another. Such a friction process can lead to the development of a considerable amount of noise, i.e., squeak.

By using the additive in accordance with the invention, the development of noise is reduced or prevented.

In the following embodiments, different formulations of the inventive additive will be mentioned by way of example; that effectively prevent the development of noise.

The inventive additive and method were tested in a constant velocity joint under conditions which were similar to those existing in practical operation, especially in respect of wetness on the outer surface of the convoluted boot, dry running phase and out-of-operation conditions. The test program was based on the following parameters:

Articulation angle of the convoluted boot 40°, speed 150 rpm and room temperature.

The test cycle comprises:

0.5 h running time under wet conditions,
1.5 h running time under dry conditions,
1.5 h out-of-operation conditions.

The number of test cycles per working day was 3, with operation being discontinued over night.

Duration of tests: 10 working days.

Minimum requirement in respect of noise-free running time per day under wet conditions (spray mist): 30 minutes.

Amount of water added: approx. 0.25 to 0.5 litres of water per test cycle for a constantly wet boot surface with water dripping off in order to simulate a washing effect. Results depend on the size of the boot.

The test results are given in graphic form in FIGS. 3, 4 and 5.

FIG. 3 shows the results, in graphic form, of the application of the test program with reference to examples I, II and III.

Example I is a TPE boot containing amide wax worked in via the granulate with a concentration of the amide wax beyond the saturation limit. From day 4 onwards, the boot developed permanent squeak noise under wet conditions. FIG. 3 also shows the loss of the protective coating. With this type of material, friction loss problems in the clamping-in zones are known.

Example II is a TPE boot without noise and abrasion protection components in the boot and lubricant. This boot also developed permanent noise under wet conditions.

Example III is a TPE boot containing paraffin oil work in via the granulate with a concentration of the paraffin oil beyond the saturation limit. FIG. 3 shows clearly decreasing noise-free running times under wet conditions which indicate that the long-lasting protection is not sufficient. In some cases, with this type of material, too, friction loss problems were identified in the clamping-in zones.

FIG. 4 shows the results of examples IV and V in a graphic form. They show the influence of an additive provided on the front of the boot wall comprising hydrocarbon oils in the form of paraffinic mineral oils, naphtenic mineral oils, poly-alpha-olefins, polybutene, polyisobutelene, squalene or alkylbenzenes with straight or branched paraffinic side chains. The application time of the protective effect can be clearly seen in FIG. 4.

Example IV is a TPE boot with inventive additive in the lubricant, but without additive in the boot wall. The protective effect starts on day 3.

Example V is a TPE boot with additive in the lubricant and 0.25% PAO 80 paraffin oil provided in the granulate. With this concentration of paraffin oil below the saturation limit, no friction locking problems were observed.

FIG. 5 describes the effect of different additive compositions and quantities in the lubricant, applied to the TPE boot with worked-in amide wax in the boot material (examples I, VI and VII).

Example VI is a TPE boot as in example I, but with 10% in weight of additive in the lubricant. The composition of the additive is as follows:

10% by weight Santizizer 141 (phosphoric acid ester)
40% by weight of Priolube 3999 (fatty acid ester)
40% by weight of Unislip 1757(amide wax, low-melting)
10% by weight of EDS (amide wax, high-melting)

As seen in FIG. 5, the initial behavior of example VI is similar to that of example I, but with improved long-term protective effect from day 4 onwards.

Example VIII is a TPE boot as in example VI, but with a different composition of additive:

10% by weight of Santizizer 141 (phosphoric acid ester)
80% by weight of Unislip 1757 (amide wax, low melting)
10% by weight of EDS (amide wax, high-melting)

As seen in FIG. 5, the protective effect is similar to example VI, but lasting somewhat longer.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A system comprising a convoluted boot in a constant velocity joint and a lubricant for a constant velocity joint, the boot comprising a thermoplastic elastomer material selected from the group consisting of polyurethane (TPU), polyamide (TPA), polyolefins (TPO), polyester (TPEE), or a thermoplastic elastomer vulcanizate (TPV) or a thermoplastic poly-ether-ester-elastomer (TEEE), wherein the convoluted boot and the lubricant contain an additive comprising amide waxes in a concentration below the saturation limit in the convoluted boot, and a diffusion-promoting admixture, wherein the diffusion-promoting admixture is provided in the form of phosphoric acid ester, fatty acid ester, or thioether wherein the phosphoric acid ester and fatty acid ester are both in the form of diester or polyolester.

2. A system according to claim 1, wherein the amide waxes are provided in the form of monoamides or diamides of carboxylic acids with 8 to 50 carbon atoms.

3. A system according to claim 1, wherein the amide waxes are provided in the form of oleic acid amide or ethylenediamine distearate.

4. A system according to claim 1, wherein the convoluted boot contains an additive comprising hydrocarbon oil in a concentration below the saturation limit of the additive in the convoluted boot material.

5. A system according to claim 4, wherein the convoluted boot contains 0.1 to 1.0% by weight of amide wax.

6. A system according to claim 5, wherein the convoluted boot contains 0.1 to 5% by weight of diffusion-promoting admixture.

7. A system according to claim 6, wherein the convoluted boot contains 0.1 to 1.0% by weight of diffusion-promoting admixture.

8. A system according to claim 4, wherein the convoluted boot contains 0.1 to 5% by weight of hydrocarbon oil or 0.1 to 5% by weight of amide wax and hydrocarbon oil in total.

9. A system according to claim 8, wherein, in the convoluted boot, there are contained hydrocarbon oils with a molecular weight ranging between 150 and 2,000.

10. A system according to claim 9, wherein the hydrocarbon oils are provided in the form of paraffinic mineral oils, naphtenic mineral oils, poly-alpha-olefins, polybutene, polyisobutelene, squalene or alkylbenzenes with straight or branched paraffinic side chains.

11. A system according to claim 8, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

12. A system according to claim 8, wherein the convoluted boot contains 0.1 to 5% by weight of diffusion-promoting admixture.

13. A system according to claim 12, wherein the convoluted boot contains 0.1 to 1.0% by weight of diffusion-promoting admixture.

14. A system according to claim 4, wherein, in the convoluted boot, there are contained hydrocarbon oils with a molecular weight ranging between 150 and 2,000.

15. A system according to claim 14, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

16. A system according to claim 4, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

17. A system according to claim 4, wherein the amide waxes are provided in the form of monoamides or diamides of carboxylic acids with 8 to 50 carbon atoms.

18. A system according to claim 4, wherein the amide waxes are provided in the form of oleic acid amide or ethylenediamine distearate.

19. A system according to claim 4, wherein the convoluted boot contains 0.1 to 5% by weight of diffusion-promoting admixture.

20. A system according to claim 19, wherein the convoluted boot contains 0.1 to 1.0% by weight of diffusion-promoting admixture.

21. A system according to claim 1, wherein the convoluted boot contains 0.1 to 1.0% by weight of amide wax.

22. A system according to claim 21, wherein the amide waxes are provided in the form of monoamides or diamides of carboxylic acids with 8 to 50 carbon atoms.

23. A system according to claim 21, wherein the amide waxes are provided in the form of oleic acid amide or ethylenediamine distearate.

24. A system according to claim 21, wherein the convoluted boot contains 0.1 to 5% by weight of diffusion-promoting admixture.

25. A system according to claim 24, wherein the convoluted boot contains 0.1 to 1.0% by weight of diffusion-promoting admixture.

26. A system according to claim 1, wherein the convoluted boot contains 0.1 to 5% by weight of diffusion-promoting admixture.

27. A system according to claim 26, wherein the convoluted boot contains 0.1 to 1.0% by weight of diffusion-promoting admixture.

28. A lubricant comprising an additive consisting of amide waxes and diffusion-promoting admixtures wherein the lubricant is disposed in a constant velocity joint with a convoluted boot and wherein the additive further consists of 0.1 to 5% by weight of hydrocarbon oil, and phosphoric acid ester, fatty acid ester, or thioether wherein the phosphoric acid ester and fatty acid ester are both in the form of a diester or polyolester.

29. A lubricant according to claim 28, wherein the additive, in the form of amide waxes, contains oleic acid amide or ethylenediamine distearamide.

30. A lubricant according to claim 28, wherein the lubricant contains 0.1 to 5.0% by weight of diffusion-promoting admixtures.

31. A lubricant according to claim 28, wherein the additive contains 0.1 to 5% by weight of amide wax and hydrocarbon oil in total.

32. A lubricant according to claim 31, wherein the lubricant contains 0.1 to 10% by weight of amide wax.

33. A lubricant according to claim 31, wherein the lubricant contains 0.1 to 1.0% by weight of amide wax.

34. A lubricant according to claim 31, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

35. A lubricant according to claim 28, wherein the lubricant contains 0.1 to 10% by weight of amide wax.

36. A lubricant according to claim 35, wherein the additive contains hydrocarbon oils with a molecular weight ranging between 150 and 2000.

37. A lubricant according to claim 35, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

38. A lubricant according to claim 35, wherein the lubricant contains 0.1 to 5.0% by weight of diffusion-promoting admixtures.

39. A lubricant according to claim 28, wherein the lubricant contains 0.1 to 1.0% by weight of amide wax.

40. A lubricant according to claim 39, wherein the additive contains hydrocarbon oils with a molecular weight ranging between 150 and 2000.

41. A lubricant according to claim 39, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

42. A lubricant according to claim 28, wherein the additive contains hydrocarbon oils with a molecular weight ranging between 150 and 2000.

43. A lubricant according to claim 42, wherein the hydrocarbon oils are provided in the form of paraffinic mineral oils, naphtenic mineral oils, poly-alpha-olefins, polybutene, polyisobutylene, squalene or alkylbenzenes with straight or branched paraffinic side chains.

44. A lubricant according to claim 28, wherein the additive, in the form of amide waxes, contains monoamides or diamides of carboxylic acids with 8 to 50 carbon atoms.

45. A lubricant according to claim 44, wherein the additive, in the form of amide waxes, contains oleic acid amide or ethylenediamine distearamide.

* * * * *